US006771468B1

United States Patent
Levi et al.

(10) Patent No.: US 6,771,468 B1
(45) Date of Patent: Aug. 3, 2004

(54) SLIDER WITH HIGH PITCH-STIFFNESS AIR BEARING DESIGN

(75) Inventors: Pablo Gabriel Levi, Sunnyvale, CA (US); Manuel Anaya Dufresne, Fremont, CA (US); Biao Sun, Fremont, CA (US); Forhad Hossain, Fremont, CA (US)

(73) Assignee: Western Digital Corporation, Lake Forest, CA (US)

( * ) Notice: Subject to any disclaimer, the term of this patent is extended or adjusted under 35 U.S.C. 154(b) by 0 days.

(21) Appl. No.: 10/007,430

(22) Filed: Oct. 22, 2001

(51) Int. Cl.$^7$ .............................................. G11B 5/60
(52) U.S. Cl. ........................ 360/235.5; 360/235.6; 360/235.7; 360/235.8; 360/236.1; 360/236.2; 360/236.3
(58) Field of Search ......................... 360/235.5–236.3

(56) References Cited

U.S. PATENT DOCUMENTS

| | | | |
|---|---|---|---|
| 5,072,322 A | 12/1991 | Yasar et al. ............... 360/234.7 |
| 5,105,529 A | 4/1992 | Yasar et al. ............... 29/603.04 |
| 5,345,353 A | 9/1994 | Krantz et al. ............ 360/236.6 |
| 5,515,219 A | 5/1996 | Ihrke et al. ............... 360/236.1 |
| 5,612,839 A | 3/1997 | Jacques .................... 360/246.2 |
| 5,624,581 A | 4/1997 | Ihrke et al. .................... 216/22 |
| 5,625,513 A | 4/1997 | Utsunomiya et al. .... 360/236.8 |
| 5,703,740 A | 12/1997 | Cohen et al. ............... 360/126 |
| 5,768,055 A | 6/1998 | Tian et al. ................ 360/235.2 |
| 5,796,551 A | 8/1998 | Samuelson ............... 360/236.8 |
| 5,841,608 A | 11/1998 | Kasamatsu et al. ...... 360/236.6 |
| 5,870,250 A | 2/1999 | Bolasna et al. .......... 360/236.8 |
| 5,910,864 A | 6/1999 | Hira et al. ................ 360/235.9 |
| 5,912,791 A | 6/1999 | Sundaram et al. .......... 360/135 |
| 5,920,978 A | 7/1999 | Koshikawa et al. ...... 29/603.12 |
| 5,995,342 A | 11/1999 | Cohen et al. ................ 360/126 |
| 6,075,683 A | 6/2000 | Harwood et al. ........... 360/135 |
| 6,117,283 A | 9/2000 | Chen et al. ............. 204/192.23 |
| 6,120,694 A | 9/2000 | Kasamatsu et al. ........... 216/22 |
| 6,128,162 A | 10/2000 | Kameyama ............... 360/236.2 |
| 6,181,531 B1 | 1/2001 | Koshikawa et al. ...... 360/294.4 |
| 6,196,062 B1 | 3/2001 | Wright et al. .................. 73/105 |
| 6,198,601 B1 | 3/2001 | Hira et al. ................ 360/235.9 |
| 6,243,222 B1 | 6/2001 | Boutaghou et al. ....... 360/73.03 |
| 6,246,538 B1 | 6/2001 | Kasamatsu et al. ...... 360/97.01 |
| 6,351,345 B1 * | 2/2002 | Kameyama .............. 360/236.3 |
| 6,396,664 B2 * | 5/2002 | Koishi et al. ............. 360/235.8 |

* cited by examiner

*Primary Examiner*—Robert S. Tupper

(57) ABSTRACT

A slider utilizes a triple-etch, high pitch-stiffness side rail ABS design. The slider is characterized by a relatively deep shallow recession at its leading edge, which maximizes the cavity area while at the same time increases the pitch angle to achieve DLC pad clearance as required by smooth media ABS designs. The slider ABS has a shallower recession at the trailing edge, which provides low gram-load sensitivity and low flying standard deviation. The slider ABS further presents a decreased sensitivity in response to altitude variations.

20 Claims, 8 Drawing Sheets

SLIDER WITH HIGH PITCH-STIFFNESS AIR BEARING DESIGN

FIELD OF THE INVENTION

The present invention relates in general to data storage systems such as disk drives, and it particularly relates to a thin film read/write head for use in such data storage systems. More specifically, the present invention discloses a new slider design utilizing a high-pitch stiffness air bearing design for smooth media drive applications.

BACKGROUND OF THE INVENTION

In a conventional magnetic storage system, a thin film magnetic head includes an inductive read/write element mounted on a slider. The magnetic head is coupled to a rotary actuator magnet and a voice coil assembly by a suspension and an actuator arm positioned over a surface of a spinning magnetic disk.

In operation, a lift force is generated by the aerodynamic interaction between the magnetic head and the spinning magnetic disk. The lift force is opposed by equal and opposite spring forces applied by the suspension such that a predetermined flying height is maintained over a full radial stroke of the rotary actuator assembly above the surface of the spinning magnetic disk.

The flying height is defined as the spacing between the surface of the spinning magnetic disk and the lowest point of the slider assembly. One objective of the design of magnetic read/write heads is to obtain a very small flying height between the read/write element and the disk surface. By maintaining a flying height close to the disk, it is possible to record short wavelength or high frequency signals, thereby achieving high density and high storage data recording capacity.

A problem with flying the slider close to the disk surface is that when there is any variation of slider flying height, the possibility of physical interference between the slider and the disk may result in reliability problems and head crashes. Therefore, one objective of the slider design is to maintain a substantially constant flying height close to the disk surface, while minimizing flying height variations when operating the disk drive in a different environment, since variations in head-to-disk spacing may adversely affect signal amplitude and resolution, and may possibly cause head crashes.

An important consideration in slider design for controlling the aerodynamic interaction between the magnetic head and the spinning magnetic disk thereunder, is the air bearing surface. Sliders used in disk drives typically have a leading edge, and a trailing edge at which thin film read/write heads are typically deposited. Generally, sliders have tapered portions at the leading edge and longitudinal side rails that extend from the tapers to the trailing edge.

The tapers may be shaped and of such length as to provide fast pressure buildup during takeoff of the slider from a rest position to a flying height relative to the disk with controlled pitch. The dimensions and shapes of the tapers and side rails are instrumental in determining the flying characteristics of the head. The side rail design determines the pressure generated at the ABS of the slider. In effect, the pressure distribution on the ABS contributes to the flying characteristics of the slider that include flying height, pitch, and roll of the read/write head relative to the rotating magnetic disk.

A conventional magnetic medium, such as a magnetic recording disk, includes a landing zone, which is defined as an annulus area of a width of about 0.5 cm (0.2 in) located at the inner radius of the magnetic disk. The landing zone is made of a non-magnetic material, as its function is not for data recording but is to provide a surface upon which the slider comes to rest in between track seeks during a read/write operation. The surface of the landing zone is typically designed to have a certain degree of roughness so as to prevent stiction between the slider and the disk, and to enable a fast take-off of the slider.

As the continuing trend toward high capacity storage applications currently prevails in this industry, smooth media applications have emerged. A smooth medium disk is characterized by a finely polished surface in its entirety from the outer radius to the inner radius of the disk without a landing zone. The reduced surface roughness allows for lower fly heights, which results in increased data compared to conventional media disks.

The increasing use of smooth media applications, however, poses a technical difficulty with a conventional ABS slider. Because of the low surface roughness of the smooth media disk, the stiction force may increase substantially, thereby preventing the conventional slider from taking off rapidly and smoothly from the surface of the smooth media disk.

To address this problem, sliders have been designed with a dual-etch ABS incorporating Diamond Like Carbon (DLC) pads. In order to maintain a proper trailing edge DLC pad clearance, the slider is required to possess a pitch angle relative to the surface of the disk. The pitch angle is the angle between the planar surface of the media disk and the longitudinal axis of the slider or the arm assembly to which the slider is secured. Because the DLC pads protrude from the surface of the ABS on the slider, it is usually difficult to achieve the clearance between the DLC pads and the surface of the disk.

Without a proper clearance, the DLC pads can come in contact with the surface of the disk, thereby causing physical wear of the disk surface. One conventional method of achieving this clearance is by increasing the leading edge ABS area to raise the pitch angle. Nevertheless, this approach is not entirely satisfactory because the reduction in the leading edge ABS area usually accompanies a lower overall stiffness which can adversely affect the flying characteristics of the slider. Yet, another method of achieving the same objective is to have a relatively deep shallow recession. It, too, fails to provide a desirable solution for achieving the clearance because, in so designed, the gram-load sensitivity and the flying standard deviation of the slider are degraded.

Still another concern arises with the conventional dual-etch ABS slider design. When smooth media disk drives that incorporate rotating smooth media disks and read/write heads with dual-etch ABS sliders are used at relative high altitudes such as 10,000 ft above the sea level, for example, the less air density and ambient pressure adversely affect the slider aerodynamic characteristics which contribute to the flying performance of the dual-etch ABS sliders. Specifically, in the dual-etch ABS slider design, the cavity area is be reduced in order to raise the pitch angle.

Since the lift force is proportional to the cavity area and the ambient pressure, the dual-etch ABS sliders experience a significant reduction in lift at high altitude. Consequently, the flying height of the dual-etch ABS slider substantially decreases from the design flying height, thereby causing the slider to move closer to the surface of the rotating magnetic disk. Hence, this poses a significant concern with a physical interference between the read/write head and the rotating disk that may lead to a head crash or excessive wear of the magnetic disk surface, and thus rendering the disk drive less reliable.

It is thus recognized in light of the above concerns, that there is an unfulfilled need for an improvement in the ABS slider design for smooth media applications. Preferably, the new slider design should provide a necessary DLC pad clearance as required for smooth media applications, without adversely affecting the slider performance characteristics such as ABS stiffness and gram-load sensitivity. Furthermore, the new slider design should exhibit an improved altitude sensitivity.

SUMMARY OF THE INVENTION

It is a feature of the present invention to provide a new ABS slider design for use with smooth media applications. The new slider utilizes a triple-etch, high pitch-stiffness side rail ABS design incorporating the following features:

1. A relatively deep shallow recession at the leading edge of the slider, which maximizes the cavity area while at the same time increases the pitch angle to achieve the DLC pad clearance as required by smooth media ABS designs.
2. A shallower recession at the trailing edge of the slider, which provides low gram-load sensitivity and low flying standard deviation.
3. A decreased sensitivity in response to altitude variations.

The foregoing and other features of the present invention are realized by a slider having a generally rectangularly shaped ABS that is bounded by a leading edge, a trailing edge, and two sides. A shallow step region having the shape of the letter "C" is formed on the ABS.

The shallow step region is formed by etching the ABS to a depth of approximately 0.25 $\mu$m relative to a reference datum. In contrast to the dual-etch ABS slider, the shallow step region of the present ABS design has a greater depth than that of the conventional shallow step region. This greater depth provides the necessary high pitch angle as required to maximize the clearance between DLC pads and the disk.

An ABS region adjoins the shallow step region. The area of the present ABS region is generally smaller than that of the ABS region of a conventional dual-etch ABS slider, thereby making it less susceptible to camber and crown sensitivities due to the respective curvatures in the axial direction from the leading edge to the trailing edge, and in the transverse direction from side to side of the ABS. The reduced camber and crown sensitivities of the ABS region enhance the flying height performance of the triple-etch high pitch-stiffness slider.

A cavity region adjoins the ABS region and has a generally polygonal shape that is formed by etching to a depth that ranges between approximately 50 $\mu$m and 80 $\mu$m relative to the reference datum of the ABS.

BRIEF DESCRIPTION OF THE DRAWINGS

The features of the present invention and the manner of attaining them will become apparent, and the invention itself will be understood by reference to the following description and the accompanying drawings, wherein.

Similar numerals in the drawings refer to similar elements. It should be understood that the sizes of the different components in the figures might not in exact proportion, and are shown for visual clarity and for the purpose of explanation.

DETAILED DESCRIPTION OF THE PREFERRED EMBODIMENTS

Figure 1:
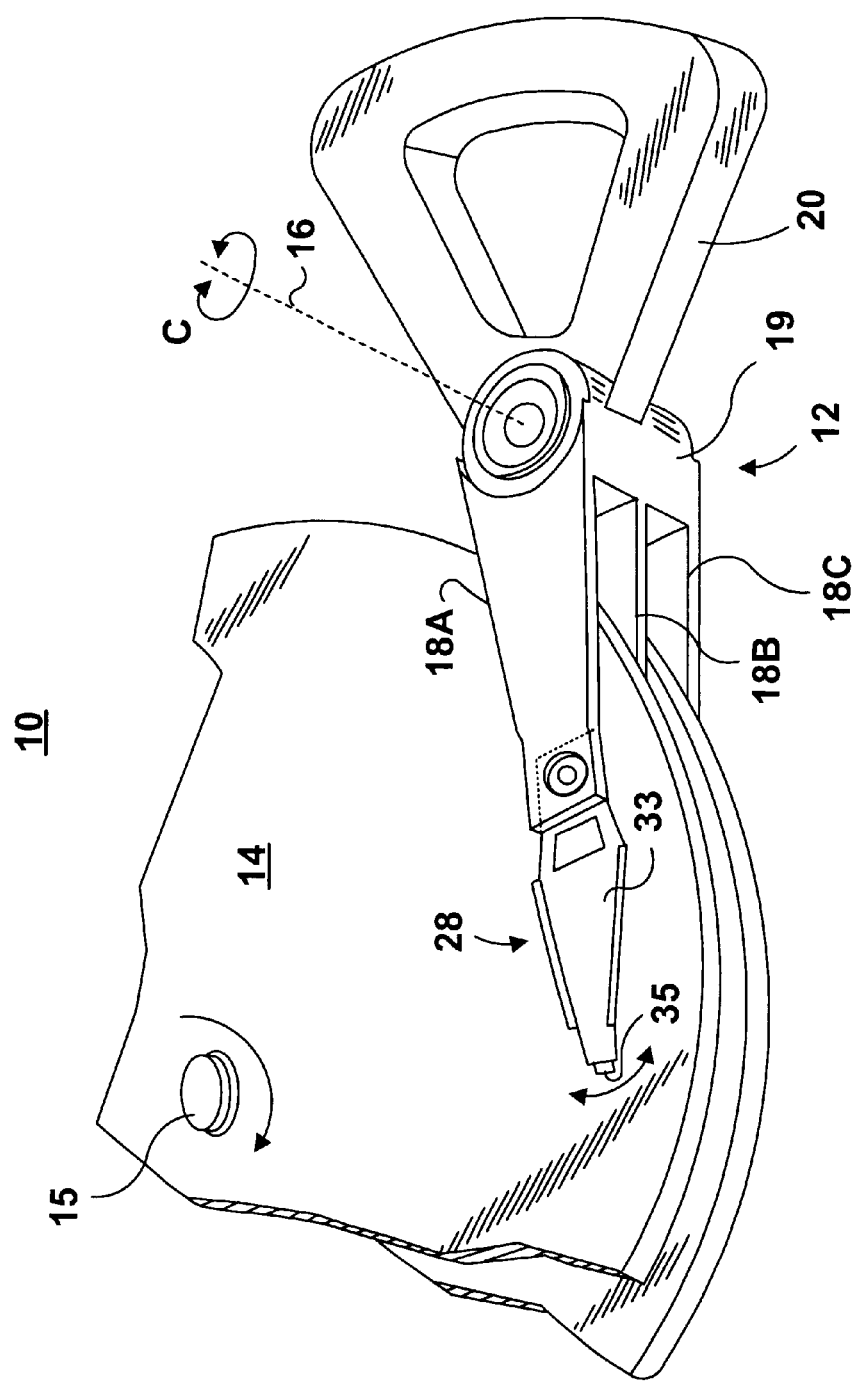
FIG. 1 is a fragmentary perspective view of a data storage system utilizing a read/write head of a conventional design or of the present invention.

FIG. 1 illustrates a disk drive 10 comprised of a head stack assembly 12 and a stack of spaced apart smooth media magnetic data storage disks or smooth media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

Figure 2:
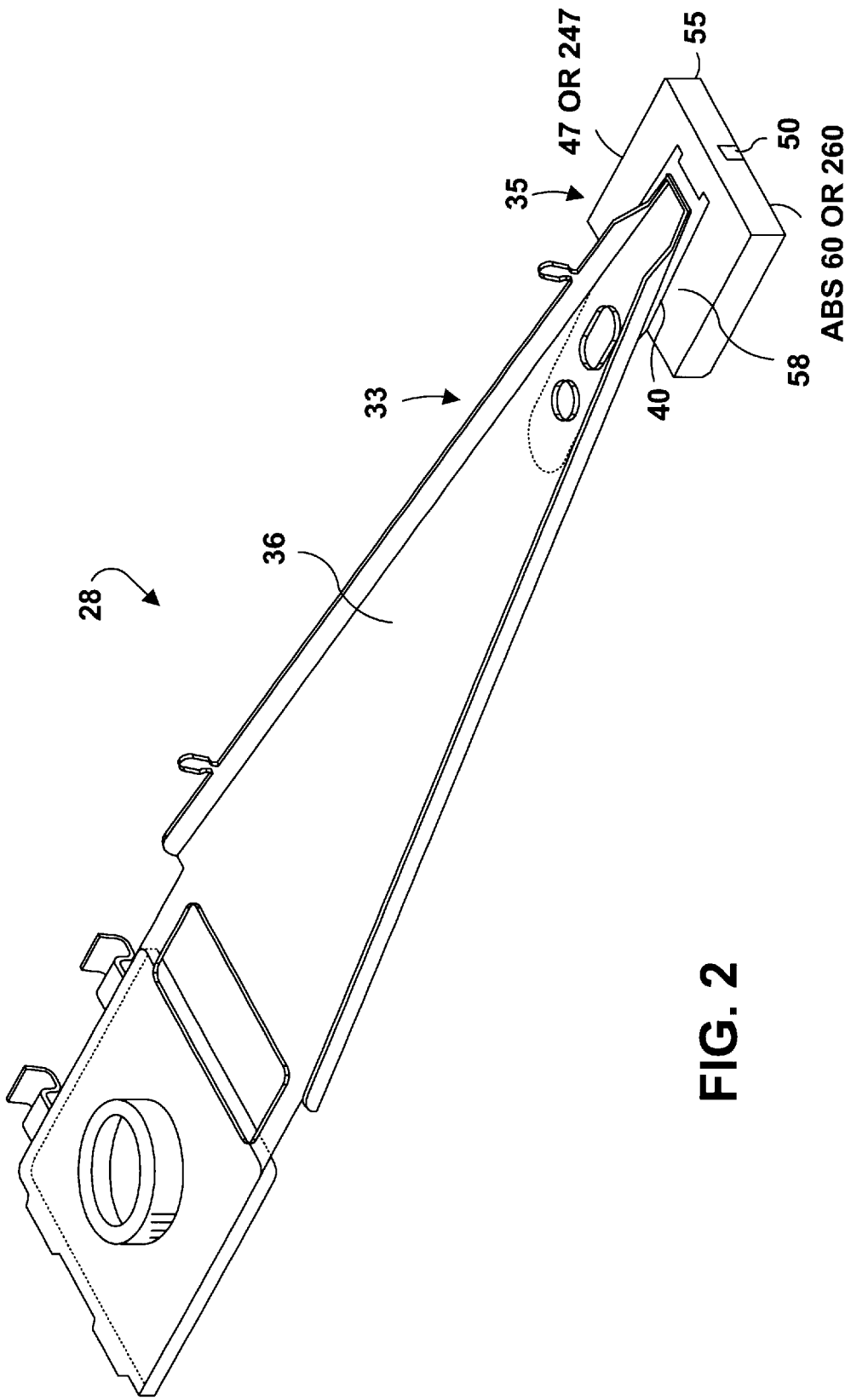
FIG. 2 is a perspective view of a head gimbal assembly comprised of a suspension, and a slider to which the read/write head of FIG. 1 is secured, for use in a head stack assembly.

A head gimbal assembly (HGA) 28 is secured to each of the actuator arms, for instance 18A. With reference to FIG. 2, the HGA 28 is comprised of a suspension 33 and a read/write head 35. The suspension 33 includes a resilient load beam 36 and a flexure 40 to which the head 35 is secured.

The head 35 is formed of either a slider 47 that is secured to the free end of the load beam 36 by means of the flexure 40, and a read/write element 50 that is supported by the slider 47. The read/write element 50 is mounted at the trailing edge 55 of the slider 47 so that its forwardmost tip is generally flush with the ABS 60 of the slider 47.

Figure 3:
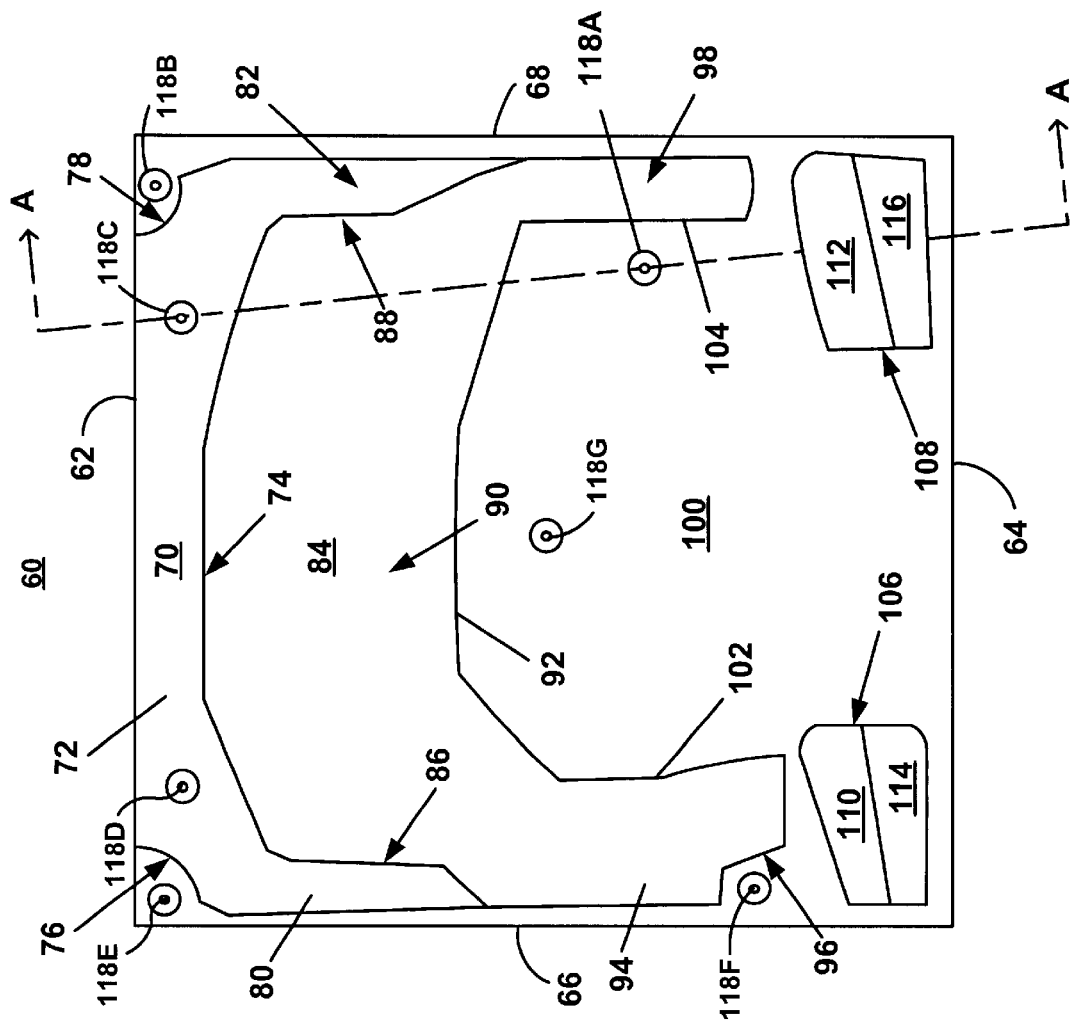
FIG. 3 is a bottom view of a conventional dual-etch ABS slider.
Figure 4:
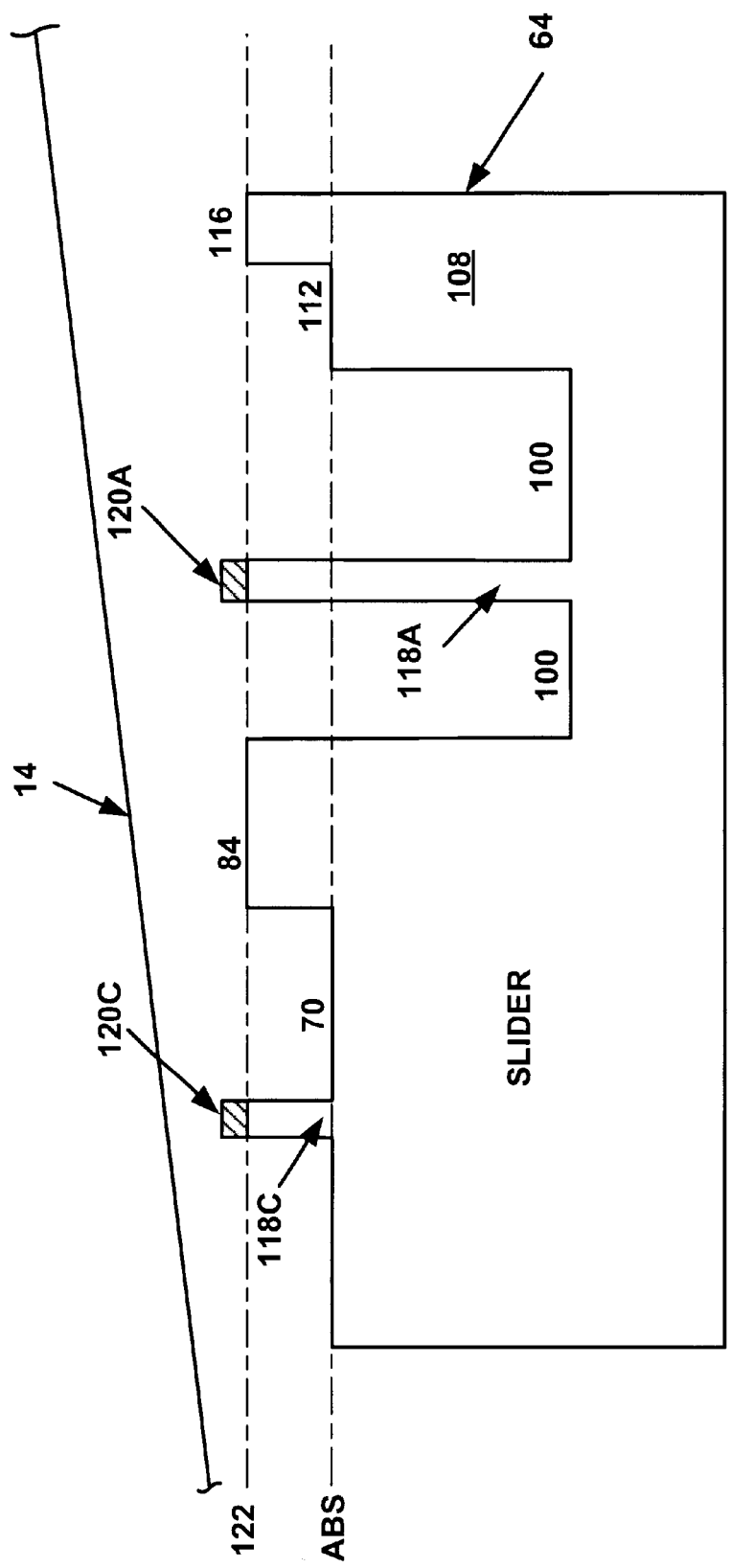
FIG. 4 is a cross-sectional view of the conventional slider of FIG. 3, taken along section A—A thereof.

In order to appreciate the novelty and advantages of the present invention, a conventional dual-etch ABS slider design will now be described with reference to FIGS. 3, 4, and 5. FIGS. 3 and 4 illustrate a patterned ABS 60 of a dual-etch ABS slider having a leading edge 62 and a trailing edge 64. The ABS 60 typically has a rectangular shape and is bounded by the leading edge 62, the trailing edge 64, and the two sides 66 and 68. A topology of varying depths is formed on the ABS 60.

The topology includes a shallow step region 70 that has the shape of the letter "C". The step region 70 is comprised of a leading edge area 72 and two side rails 80, 82. The step region 70 is generally bounded by the leading edge 62 and a segmented edge 74. Notches 76 and 78 at formed at two corners of the leading edge area 72.

The side rails 80, 82 extend from the leading edge 62 and are slightly recessed inwardly from the slider sides 66 and 68, respectively. The step region 70 is formed by etching the slider ABS to a depth ranging from approximately 0.1 μm to 0.3 μm relative to a reference datum 122 (FIG. 4) of the ABS 60.

An ABS region 84 adjoins the shallow step region 70 along the segmented edge 74 and the inner edges 86 and 88 of the side rails 80 and 82 that are common to both the shallow step region 70 and the ABS region 84. The ABS region 84 is generally formed of a horseshoe shape having three identifiable areas. A leading edge ABS area 90 having the largest footprint, is generally bounded by the segmented edge 74 and another segmented edge 92.

A first side rail ABS area 94 is generally disposed along the side 66 of the ABS 60 and extends from the leading edge ABS area 90 to a notch 96. A second side rail ABS area 98 having the smallest footprint is generally disposed along the side 68 of the ABS 60 and extends from the leading edge ABS area 90. The top surface of the ABS region 84 defines the reference datum height 122 for the ABS 60 (FIG. 4).

A cavity region 100 adjoins the central region 84 along a segmented edge 92 and inner edges 102 and 104 of side rails 94, 98, respectively. The cavity region 100 has a generally polygonal shape, extends from the segmented edge 92 to the slider trailing edge 64, and is formed by etching the slider ABS to a depth ranging between approximately 1 μm to 3 μm relative to the reference datum 122 (FIG. 4).

Two oppositely disposed islands 106 and 108 are formed near the corners of the ABS 60, adjacent to the trailing edge 64. Each of these islands 106 and 108 includes a respectively small shallow step region (110 and 112, respectively), and a small ABS region (114 and 116, respectively). The shallow step regions 110 and 112 are formed by etching the ABS 60 to the same depth as that of the shallow step region 70.

A plurality of posts are positioned at various locations throughout the ABS 60. With reference to FIG. 3, the ABS 60 is shown to have seven posts 118A–118G. With reference to FIG. 4, the posts 118A, 118C have a generally cylindrical shape, and protrude outwardly from the bottom of either the shallow step region 70 (post 118C), or from the cavity region 100 (post 118A).

FIG. 4 illustrates only two DLC pads 120A, 120C that are secured to the tips of the posts 118A, 118C, respectively. Other DLC pads (not shown) are secured to the remaining posts 118B and 118D–118G. The posts 118A, 118C raise the DLC pads 120A, 120C, respectively, to a height, such that the DLC pads 120A, 120C are raised above the reference datum 122.

When the slider is in a rest position on a smooth medium disk 14, the DLC pads, such as the illustrated DLC pads 120A, 120C, come into contact with the disk 14, and provide a support to the ABS 60, thereby preventing the ABS region 70, and the plateaus such as 84 and 116, from making contact with the surface of the disk 14.

Figure 5:
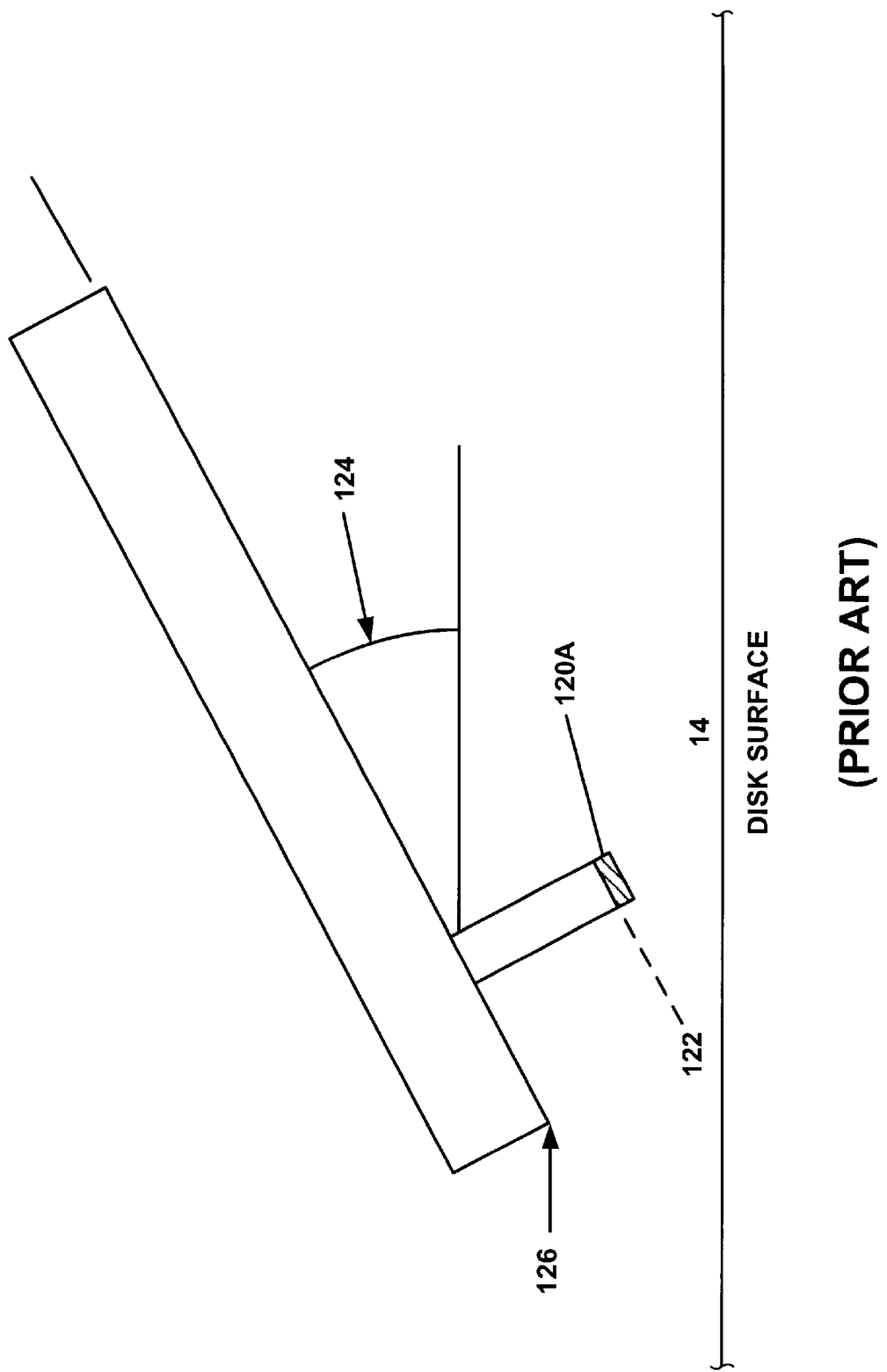
FIG. 5 is a graphical illustration of the pitch angle and DLC pads of the slider of FIGS. 3 and 4.

FIG. 5 illustrates the concerns associated with the conventional slider design of FIGS. 3 and 4. An exemplary DLC pad 120A is shown to extend beyond the reference datum 122 of the ABS 60, at a low pitch angle 124. However, relative to the disk surface, the DLC pad 120A is lower than the lowest point 126 of the slider ABS 60. This poses a possibility of a physical contact between the DLC pads 120A and the surface of the disk 14, in the event the aerodynamic lift force is not optimal. Such a physical contact would cause physical wear of the disk 14 and the DLC pads, and thus presents a reliability problem for the magnetic disk drive 10.

In order to reduce this contact possibility, the DLC pads 120A should be above the lowest point 126 of the slider ABS 60, relative to the disk 14. This can be achieved by increasing the pitch angle 124 sufficiently so that the DLC pads (i.e., 120A) are situated above the lowest point 126.

One approach for increasing the pitch angle 124 is to make the shallow step region 70 deeper. However, when the depth of the shallow region 70 increases, the gram-load sensitivity also increases and adversely affects the performance of the slider.

Alternatively, the pitch angle 124 can be increased by increasing the leading edge ABS area 90 of the ABS region 84. However, an increase in the leading edge ABS area 90 is typically accompanied by a reduction in the area of the cavity region 100. This also poses a problem with the stiffness of the slider.

The cavity region 100 is designed to generate a subambient pressure due to the aerodynamic interaction between the ABS 60 of the slider and the surface of the spinning disk 14. This subambient pressure creates a suction force that effectively augments the structural stiffness of the slider to produce the desired flying height. When the area of the cavity region 100 is reduced, the aerodynamically induced stiffness of the slider also decreases and causes large standard deviations in the fly heights of a population of sliders, thereby further exacerbating the slider reliability problem. Moreover, the reduction in the size of the cavity region 100 leads to an increase in the fly height sensitivity of the ABS altitude changes.

It is therefore recognized that what is needed is a new design that provides a high pitch angle 124 for maximizing the DLC pad (i.e., 120A) clearance and a larger area of the cavity region 100 for improving the altitude sensitivity, without increasing the gram-load sensitivity, or reducing the overall stiffness of the slider.

To this end, a new high pitch-stiffness ABS slider design for smooth media drive applications in accordance with the present invention is proposed. This new design is also referred to herein as a triple-etch high pitch-stiffness ABS slider design.

Figure 6:
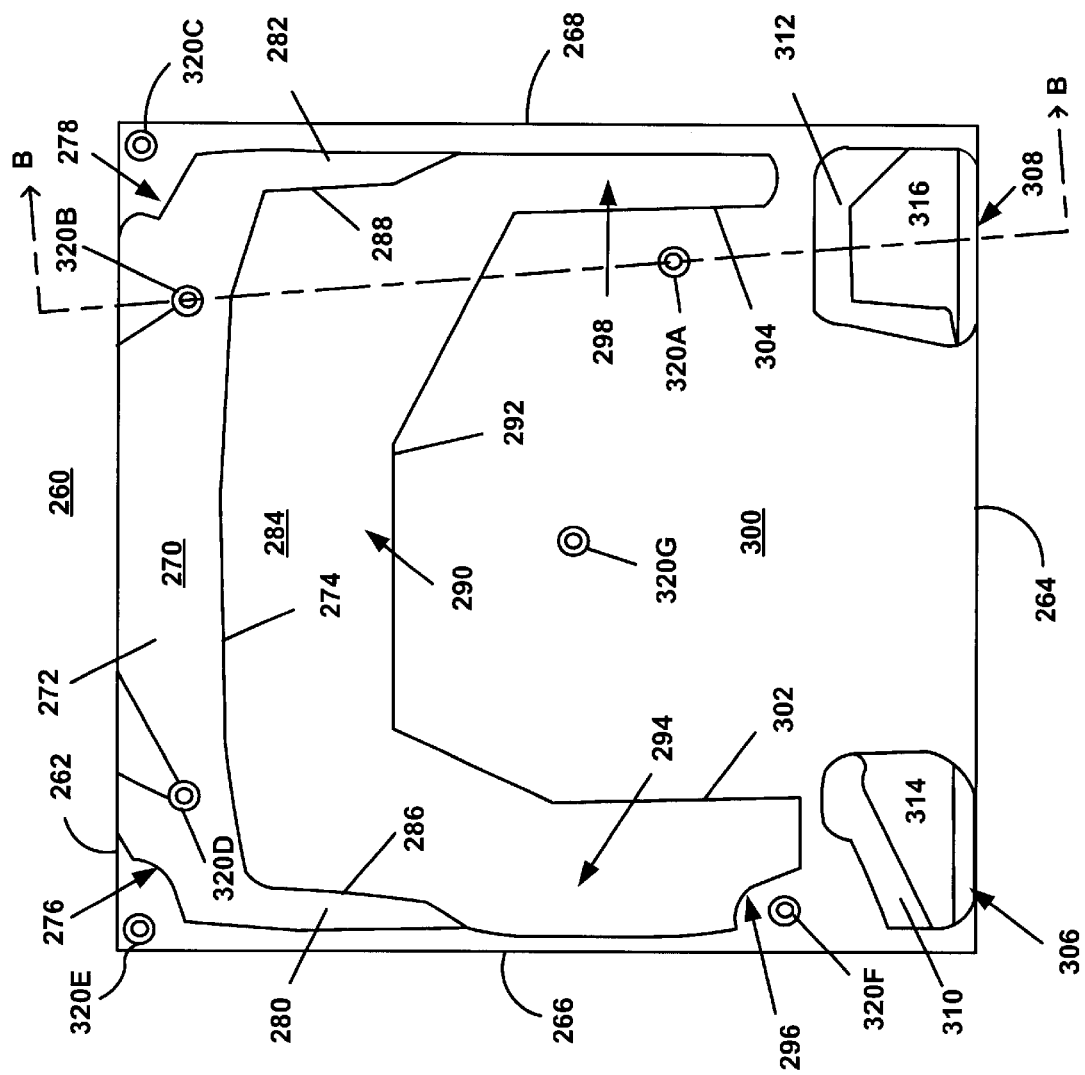
FIG. 6 is a bottom view of a triple-etch high pitch-stiffness ABS slider according to the present invention.
Figure 7:
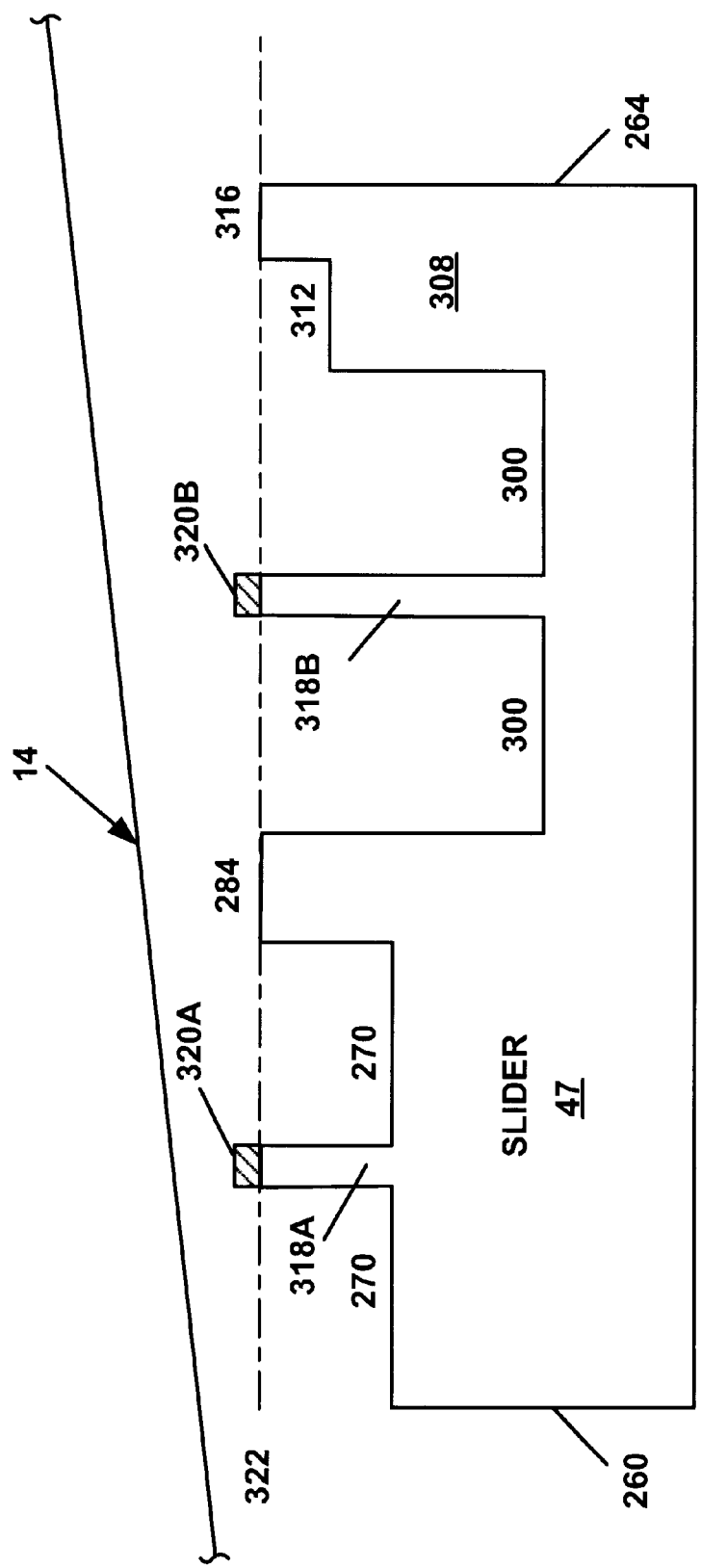
FIG. 7 is a cross-sectional view of the slider of FIG. 6, taken along section B—B.

FIGS. 6 and 7 show a slider 47 having a ABS 260 that is patterned according to the present invention. The ABS 260 has a generally rectangular shape that is bounded by a leading edge 262, a trailing edge 264, and two sides 266, 268.

A shallow step region 270 having the shape of the letter "C" is formed on the ABS 260. The step region is formed of three areas: a leading edge area 272 and two side rails 280, 282. The leading edge area 272 is generally bounded by the leading edge 262 and a segmented edge 274.

Notches 276, 278 are formed at the corners of the leading edge area 272. The side rails 280, 282 extend from the leading edge 262 and are slightly recessed inwardly from the sides 266, 268.

The shallow step region 270 is formed by etching the ABS 260 to a depth of approximately 0.25 μm relative to a reference datum 322 of the ABS 260 (FIG. 7). In contrast to the dual-etch ABS slider of FIGS. 3 and 4, the shallow step region 270 has a greater depth than that of the shallow step region 70. This greater depth provides the necessary high pitch angle 124 as required to maximize the clearance between DLC pads and the disk 14.

An ABS region 284 adjoins the shallow step region 270 along the segmented edge 274 and the inner edges 286 and 288 of the side rails 280 and 282, respectively. The ABS region 284 is generally formed of a horseshoe shape having three identifiable areas: a leading edge ABS area 290, a first side rail ABS area 294, and a second side rail ABS area 298.

The leading edge ABS area 290 has a relatively large footprint and is generally bounded by the segmented edge 274 and another segmented edge 292. The first side rail ABS area 294 is generally disposed along the side 266 of the ABS 260 and extends from the leading edge ABS area 290 to a notch 296. The second side rail ABS area 298 has a smaller footprint and is generally disposed along the side 268 of the ABS 260 and extends from the leading edge ABS area 290.

The bottom surface that contains the highest point of the ABS region 284 defines the reference datum height 322 for the ABS 260. The area of the ABS region 284 is generally smaller than that of the ABS region 84 of the conventional dual-etch ABS slider (FIGS. 3, 4), thereby making it less susceptible to camber and crown sensitivities due to the respective curvatures in the axial direction from the leading edge 262 to the trailing edge 264, and in the transverse direction from side 266 to side 268 of the ABS 260. The reduced camber and crown sensitivities of the ABS region 28.4 enhance the flying height performance of the triple-etch high pitch-stiffness slider 47.

A cavity region 300 adjoins the ABS region 284 along the triply segmented edge 292 and the inner edges 302 and 304 of the side rail ABS areas 294 and 298. The cavity region 300 has a generally polygonal shape that substantially occupies the remaining area of the ABS 260. The cavity region 300 extends from the segmented edge 292 to the trailing edge 264, and is formed by etching to a depth that ranges between approximately 50 $\mu$m and 80 $\mu$m relative to the reference datum 322 of the ABS 260.

In contrast to the conventional dual-etch ABS slider of FIGS. 3 and 4, the area of the cavity region 300 of the triple-etch high pitch-stiffness ABS slider 47 of the present invention is greater than that of the cavity region 100. This increase in area of the cavity region 300 gives the ABS 260 more suction force developed thereon for the same amount of pitch angle 124 (FIG. 5), thereby substantially increasing the aerodynamically induced stiffness of the slider 47.

The resulting stiffness increase provides a significant enhancement in the high-altitude performance of the disk drive 10 that employs the triple-etch high-stiffness ABS slider 47 due to the greater suction force afforded by the larger cavity region 300 in the presence of a decrease in the ambient pressure at high altitudes. It is expected that the triple-etch high pitch-stiffness ABS slider 47 of the present invention will show a marked improvement in the altitude loss parameter on the order of 20% to 30% at an altitude of 10,000 ft above sea level, relative to the conventional dual-etch ABS slider.

Another added benefit resulting from having a larger area of the cavity region 300 is the reduction in the pitch variation.

Two oppositely disposed islands 306 and 308 are formed at the corners of the ABS 260 adjacent to the trailing edge 264. Each of the islands 306 and 308 includes, respectively, a small shallow step region 310, 312, and a small ABS region 314, 316. In a preferred embodiment, the shallow step region 310 is formed by etching to the same depth as that of the shallow step region 270, that is approximately 10 $\mu$m, and the shallow step region 312 is formed by etching to a depth of approximately 4.5 $\mu$m relative to the reference datum 322 of the ABS 260.

In conjunction with the shallow step region 270, the triple-step configuration of the triple-etch high-stiffness ABS slider 47 effectively separates the pitch angle 124 requirement from the stiffness and gram-load sensitivities. The pitch angle 124 requirement is accomplished by the increased depth of the shallow step region 270, while the reduced depth of the shallow step region 312 provides sufficient pressurization at the trailing edge 264 to reduce the gram-load sensitivity. Alternatively, the shallow step region 310 could have the same depth as that of the shallow step region 312 without substantially departing from the teaching of the present invention.

A plurality of posts that are similar in design and construction to posts 18A–18G (FIG. 4) are positioned at various locations throughout the ABS 260. With reference to FIG. 6, the ABS 260 is shown to have five posts 318A–318E (it being understood that a different number of posts may be selected).

With reference to FIG. 7, the posts 318A–318E have a generally cylindrical shape that protrude outwardly from bottom of either the shallow step region 70 or the cavity region 300. DLC pads 320A–320G are secured to the tips of the posts 318A–318E, respectively.

When the slider 47 is in a rest position on the smooth media disk 14, the DLC pads 320A–320G come into contact with the smooth media disk 14 and provide a support to the ABS 260, thus preventing the ABS region 270 from making contact with the surface of the disk 14 which would have caused a damage to the read/write element 50.

Furthermore, the DLC pads 320A–320G enable the slider 47 to take off rapidly for performing a track seek operation. The DLC pads 320A–320G are secured to the posts 318A–318E.

Figure 8:
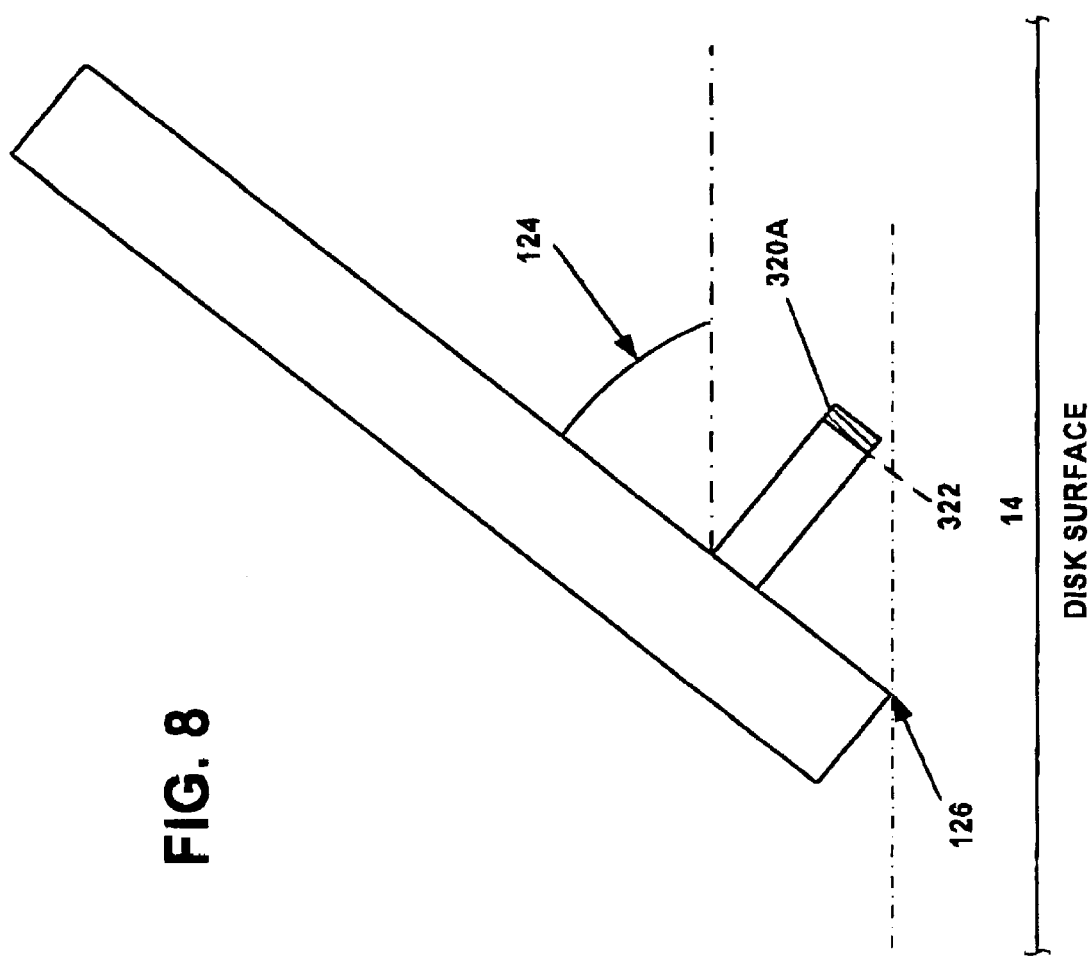
FIG. 8 is a graphical illustration of the pitch angle and DLC pads of the slider of FIGS. 6 and 7.

Thus, and as illustrated in FIG. 8, with an increased pitch angle 124, the DLC pads 320A–320G are above the lowest point 126 of the slider 47 relative to the surface of the disk 14, achieving the objective of maximizing the DLC pad clearance.

It should be understood that the geometry, compositions, and dimensions of the elements described herein can be modified within the scope of the invention and are not intended to be the exclusive; rather, they can be modified within the scope of the invention. Other modifications can be made when implementing the invention for a particular environment.

What is claimed is:

1. A slider having a slider air bearing surface (ABS) and defining a leading edge and a trailing edge, the slider comprising:

at least one post that extends from the ABS and that defines a reference datum;

the ABS comprising:

a shallow step region formed in proximity to the leading edge of the slider;

an ABS region formed adjacent the shallow step region, intermediate the leading edge and the trailing edge of the slider; and a cavity region that adjoins the ABS region and that extends to the trailing edge of the slider;

wherein the ABS defines a lowest point of the ABS relative to a data storage surface, and further defines a slider pitch angle between the ABS and a longitudinal axis of the slider;

wherein a depth of the shallow step region regulates the slider pitch angle;

wherein a surface area of the cavity region provides a subambient pressure that regulates a slider flying height; and wherein a surface area of the ABS region regulates a slider camber sensitivity and a slider crown sensitivity; and wherein the depth of the shallow step region, the surface area of the cavity region, and the surface area of the ABS region, are selected so that during operations, the lowest point of the ABS is closer to the data storage surface than the reference datum.

2. The slider of claim 1, wherein the depth of the shallow step region is approximately 0.25 μm relative to a reference datum.

3. The slider of claim 2, wherein the cavity region is formed at a depth that ranges between approximately 50 μm and 80 μm relative to the reference datum.

4. The slider of claim 3, wherein the cavity region has a generally polygonal shape.

5. The slider of claim 1, wherein the at least one post comprises at least four posts.

6. The slider of claim 1, wherein the of least one post is capped with a Diamond Like Carbon (DLC) pad.

7. The slider of claim 3, further comprising two islands that are formed near two opposite corners adjacent the trailing edge.

8. The slider of claim 7, wherein each of the two islands comprises a shallow step and a small ABS region.

9. The slider of claim 8, wherein a first island shallow step is formed to approximately the same depth as the depth of the shallow step region.

10. The slider of claim 9, wherein a second island shallow step is formed to a lesser depth than the depth of the shallow step region, relative to the reference datum.

11. The slider of claim 10, wherein the depth of the first island shallow step is approximately 10 μm, relative to the reference datum.

12. The slider of claim 11, wherein the depth of the second island shallow step is approximately 4.5 μm, relative to the reference datum.

13. A head for transacting data to and from a data storage surface comprising:

a slider having a slider air bearing surface (ABS) and defining a leading edge and a trailing edge, the slider comprising:

at least one post that extends from the ABS and that defines a reference datum;

the ABS comprising:

a shallow step region formed in proximity to the leading edge of the slider;

an ABS region formed adjacent the shallow step region, intermediate the leading edge and the trailing edge of the slider; and a cavity region that adjoins the ABS region and that extends to the trailing edge of the slider;

wherein the ABS defines a lowest point of the ABS relative to a data storage surface, and further defines a slider pitch angle between the ABS and a longitudinal axis of the slider;

wherein a depth of the shallow step region regulates the slider pitch angle;

wherein a surface area of the cavity region provides a subambient pressure that regulates a slider flying height; and wherein a surface area of the ABS region regulates a slider camber sensitivity and a slider crown sensitivity; and wherein the depth of the shallow step region, the surface area of the cavity region, and the surface area of the ABS region, are selected so that during operation, the lowest point of the ABS is closer to the data storage surface than the reference datum.

14. The head of claim 13, wherein the shallow step region is approximately 0.25 μm relative to a reference datum.

15. The head of claim 14, wherein the cavity region is formed at a depth that ranges between approximately 50 μm and 80 μm relative to the reference datum.

16. The head of claim 15, wherein the cavity region has a generally polygonal shape.

17. A head gimbal assembly comprising:

a suspension;

a slider secured to the suspension;

a read/write element secured to the slider;

wherein the slider has a slider air bearing surface (ABS) and defines a leading edge and a trailing edge; and wherein the slider comprises:

at least one post that extends from the ABS and that defines a reference datum;

the ABS comprising:

a shallow step region formed in proximity to the leading edge of the slider;

on ABS region formed adjacent the shallow step region, intermediate the leading edge and the trailing edge of the slider; and a cavity region that adjoins the ABS region and that extends to the trailing edge of the slider;

wherein the ABS defines a lowest point of the ABS relative to a data storage surface, and further defines a slider pitch angle between the ABS and a longitudinal axis of the slider;

wherein a depth of the shallow step region regulates the slider pitch angle;

wherein a surface area of the cavity region provides a subambient pressure that regulates a slider flying height; and wherein a surface area of the ABS region regulates a slider camber sensitivity and a slider crown sensitivity; and wherein the depth of the shallow step region, the surface area of the cavity region, and the surface area of the ABS region, are selected so that during operation, the lowest point of the ABS is closer to the data storage surface than the reference datum.

18. The head gimbal assembly of claim 17, wherein the shallow step region is approximately 0.25 μm relative to a reference datum.

19. The head gimbal assembly of claim 18, wherein the cavity region is formed at a depth that ranges between approximately 50 μm and 80 μm relative to the reference datum.

20. The head gimbal assembly of claim 19, wherein the cavity region has a generally polygonal shape.

* * * * *